united states patent

(12) United States Patent
Yoshizaki et al.

(10) Patent No.: US 9,658,080 B2
(45) Date of Patent: May 23, 2017

(54) IN-VEHICLE ELECTRONIC CONTROL UNIT (71) Applicant: DENSO CORPORATION, Kariya, Aichi-pref. (JP)

(72) Inventors: Tomoya Yoshizaki, Kariya (JP); Keita Oomi, Anjo (JP); Daisuke Kawakami, Anjo (JP)

(73) Assignee: DENSO CORPORATION, Kariya (JP)

(*) Notice: Subject to any disclaimer, the term of this patent is extended or adjusted under 35 U.S.C. 154(b) by 811 days.

(21) Appl. No.: 14/058,427

(22) Filed: Oct. 21, 2013

(65) Prior Publication Data
US 2014/0114599 A1  Apr. 24, 2014

(30) Foreign Application Priority Data
Oct. 23, 2012  (JP) .................. 2012-233931

(51) Int. Cl.
G01D 3/028  (2006.01)
(52) U.S. Cl.
CPC .................. G01D 3/028 (2013.01)
(58) Field of Classification Search
CPC ....................................... G01D 3/028
USPC .......................................... 702/94
See application file for complete search history.

(56) References Cited

U.S. PATENT DOCUMENTS

| 7,149,609 | B2 | 12/2006 | Hashimoto |
| 7,207,316 | B2 | 4/2007 | Moriya et al. |
| 2005/0264248 | A1* | 12/2005 | Tsunoda .................. B62D 5/049 318/434 |
| 2012/0010771 | A1* | 1/2012 | Kato ...................... B60K 6/445 701/22 |

FOREIGN PATENT DOCUMENTS

| JP | 03-268610 A | 11/1991 |
| JP | 2001-339303 A | 12/2001 |

* cited by examiner

Primary Examiner — Bryan Bui
(74) Attorney, Agent, or Firm — Posz Law Group, PLC (57) ABSTRACT

An in-vehicle electronic control unit (ECU) for correcting an error introduced to a sensor output signal as a result of amplification is provided. An output voltage of first and second voltage generators and after-amplification voltages of such output voltages are respectively A/D converted for input into a linear function. A microcomputer adjusts the output voltage of the first and second voltage generators which are amplified by the amplification circuit so that the output signals of the first and second voltage generators are adjusted to increase a voltage difference between the two. The increased voltage difference allows accurate identification of the linear function and removal of the error that is introduced to the sensor output signal during the course of processing by the amplification circuit.

6 Claims, 5 Drawing Sheets

IN-VEHICLE ELECTRONIC CONTROL UNIT

CROSS-REFERENCE TO RELATED APPLICATION

The present application is based on and claims the benefit of priority of Japanese Patent Application No. 2012-233931 filed on Oct. 23, 2012, the disclosure of which is incorporated herein by reference.

TECHNICAL FIELD

The present disclosure generally relates to an in-vehicle electronic control unit (ECU) that includes a detection function based on an analog-to-digital (A/D) conversion of a sensor output signal.

BACKGROUND

An in-vehicle ECU may receive output signals from various sensors, which are input into the in-vehicle ECU, as disclosed in a patent document 1 (i.e., Japanese Patent Laid-Open No. 2005-204080). When a signal is input into the in-vehicle ECU, the signal is processed by electronic circuits within the in-vehicle ECU. After the processing, the original signal is divided into two signals. One of the divided signals (i.e., a first signal) may be directly input into a first input terminal of a multi-channel A/D converter for an A/D conversion without a change in amplification. The other signal (i.e., a second signal) may be input into a second input terminal of the A/D converter for an A/D conversion after the signal is amplified by an amplification circuit.

When the sensor output signal that is input into the in-vehicle ECU has a low voltage level, the in-vehicle ECU uses an A/D conversion value of such a signal that is based on the second signal (i.e., a second A/D conversion value). When the sensor output signal that is input into the in-vehicle ECU has a high voltage level, the in-vehicle ECU uses an A/D conversion value of such signal based on the first signal (i.e., a first A/D conversion value).

During the processing of the second signal, an error may be introduced into the second signal. The error may be introduced into the amplification circuit by a change of an environmental factor or a usage environment, such as, for example, temperature variations of the ECU or the age of the circuit 16. Therefore, according to the patent document 1, such an error is corrected by (i) assuming that the input-output relationship of the amplification circuit is a linear function, and (ii) inputting two signals to the in-vehicle ECU respectively as the sensor output signals, which are (a) a signal having a constant 0 voltage (i.e., a 0V signal) and (b) another signal having a constant specified voltage (i.e., a specified voltage signal). More practically, to correct the error in the signal, the linear function that defines the input-output relationship of the amplification circuit is estimated based on the first A/D conversion value and the second A/D conversion value, which are respectively derived from the 0V signal and the specific voltage signal that is input into the in-vehicle ECU. The error correction is performed by using the estimated linear function.

However, when estimating the linear function, both the first A/D conversion value and the second A/D conversion value, which are respectively derived from the 0V signal and the specific voltage signal, may include errors caused by noise and the usage environment. When estimating the linear function based on such error-ridden conversion values of the first and second signals, the accuracy of the linear function estimation may improve with a greater a voltage difference between the first and second signals.

However, according to the patent document 1, the A/D converter has an inputtable voltage range with a specific upper/lower limit value of 5V and 0V, for example.

In this case, since the correction method in the patent document 1 uses first and second signals respectively having constants (i.e., 0V signal and the specific voltage signal), it is impossible for the correction method in the patent document 1 to increase the voltage difference between the first and second signals in order to accurately estimate the linear function that represents the amplification circuit. As a result, the correction method in the patent document 1 cannot accurately estimate the linear function and correct errors in the sensor output signal caused by signal processing of the amplification circuit.

SUMMARY

It is an object of the present disclosure to provide an in-vehicle electronic control unit that corrects an error in a sensor output signal when an error-ridden signal is output from an amplification circuit.

In an aspect of the present disclosure, an in-vehicle electronic control unit (ECU) includes a signal process circuit that receives and processes a sensor output signal from a sensor, a multi-channel A/D converter that performs an A/D conversion of the sensor output signal that has been processed by the signal process circuit, and a microcomputer that processes an A/D conversion value that is derived from the A/D conversion of the sensor output signal by the multi-channel A/D converter. The in-vehicle ECU also includes a first voltage generator and a second voltage generator that switch an output voltage according to an instruction from the microcomputer. In addition, the in-vehicle ECU includes an input signal switcher that switches the sensor output signal for input into the signal process circuit according to an instruction from the microcomputer, the sensor output signal for input is either (i) the sensor output signal from the sensor or (ii) a first output signal generated by the first voltage generator or a second output signal generated by the second voltage generator. The signal process circuit divides the sensor output signal that is input to the ECU into a first signal and a second signal. The first signal is input into a first input terminal of the multi-channel A/D converter and the second signal is input into a second input terminal of the multi-channel A/D converter after an amplification of the signal by an amplification circuit. The microcomputer is equipped with a first voltage controller, a second voltage controller, and an identification unit, such that the first voltage controller adjusts an output voltage of the first voltage generator so that the second signal input into the second input terminal of the multi-channel A/D converter has a voltage value that is within an inputtable voltage range of the second input terminal and is close to a lower limit of the inputtable voltage range when the first output signal generated by the first voltage generator is input to the signal process circuit. The second voltage controller adjusts an output voltage of the second voltage generator so that the second signal input to the second input terminal of the multi-channel A/D converter has a voltage value that is within an inputtable voltage range of the second input terminal and is close to an upper limit of the inputtable voltage range when the second signal generated by the second voltage generator is input to the signal process circuit. The identification unit models a linear function that linearly associates an input voltage of the amplification circuit with an output voltage of the amplification circuit and identifies the linear function of the input voltage of the amplification circuit based on (i) a first A/D conversion value and a second A/D conversion value at a time when the first output signal generated by the first voltage generator is input to the signal process circuit and (ii) a first A/D conversion value and a second A/D conversion value at a time when the second output signal generated by the second voltage generator is input to the signal process circuit.

According to the present disclosure, for the identification of the linear function that models an input-output relationship of the amplification circuit, two signals are used/input, which are an output voltage from the first voltage generator and an output voltage from the second voltage generator respectively input to the signal process circuit. The output voltage of the first voltage generator is adjusted by the first voltage controller. The first voltage controller adjusts the output voltage of the first voltage generator so that the signal input to the second input terminal of the multi-channel A/D converter has a voltage value that is within an inputtable voltage range of the second input terminal and is close to a lower limit of the inputtable voltage range when a signal generated by the first voltage generator is input to the signal process circuit.

On the other hand, the output voltage of the second voltage generator is adjusted by the second voltage controller. The second voltage controller adjusts the output voltage of the second voltage generator so that the signal input to the second input terminal of the multi-channel A/D converter has a voltage value that is within an inputtable voltage range of the second input terminal and is close to an upper boundary of the inputtable voltage range when a signal generated by the second voltage generator is input to the signal process circuit.

In such manner, in consideration of the inputtable voltage range of the second input terminal, the two output signals of the first and second voltage generators are adjusted to increase a voltage difference between the two, thereby enabling an accurate identification of the linear function that models a relationship of the input-output voltage of the amplification circuit. Therefore, a highly accurate error correction is enabled for removing an error that is added to the sensor output signal in the course of processing by the amplification circuit.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

First Embodiment

Figure 1:
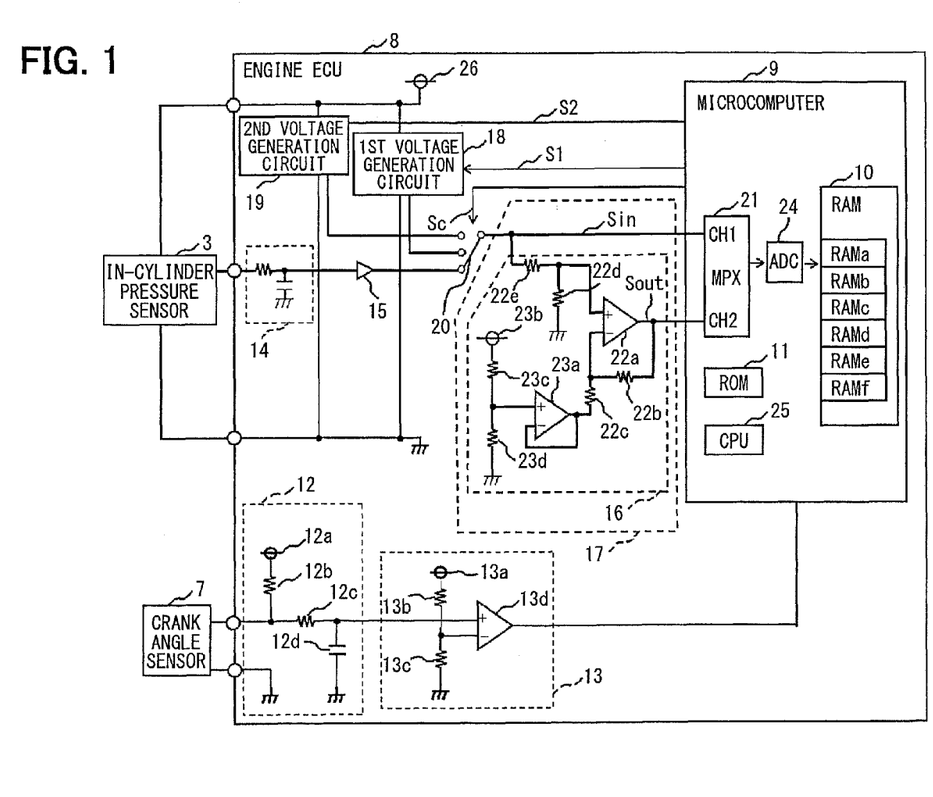
FIG. 1 is a schematic diagram of an electronic control system in a first embodiment of the present disclosure.
Figure 2:
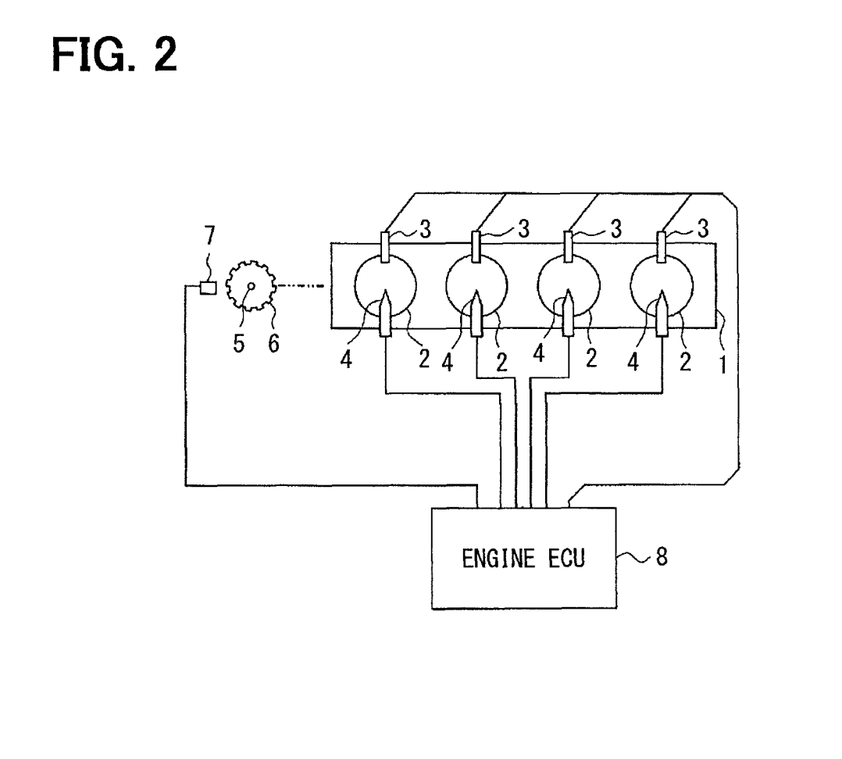
FIG. 2 is a block diagram of an engine system.

An electronic control system shown in FIG. 1 is applied to an engine system. That is, an engine 1 which is an internal combustion engine is a four-stroke engine having four cylinders 2 (i.e., cylinders #1 to #4) as shown in FIG. 2. One combustion cycle of the four-stroke engine has four processes, which are air intake, compression, combustion, and exhaustion. The four processes occur within a crank angle (° CA) cycle of 720 degrees. The four processes of one combustion cycle are performed with a delay of 180° CA between the respectively cylinders.

The cylinders 2 are positioned within an engine block and a cylinder head. A piston is located inside each of the cylinders 2. The piston is attached to a crankshaft 5 which serves as an output shaft of the engine 1. A combustion chamber is provided at a position above the piston and within the cylinder head, An in-cylinder pressure sensor 3 is disposed within an insertion aperture formed within the cylinder head. The in-cylinder pressure sensor 3 has a piezoelectric element through a diaphragm to detect a pressure in the combustion chamber. The in-cylinder pressure sensor 3 outputs a signal which is an amplified output voltage of the piezoelectric element. The voltage of the output signal of the in-cylinder pressure sensor 3 rises according to increasing in-cylinder pressure.

In the cylinder 2, an injector 4 jets fuel into the combustion chamber. Combustion of the jetted fuel into the combustion chamber causes reciprocating motion of the piston and rotation of the crankshaft 5. A pulsar 6 is attached to and rotates with the crankshaft 5. The pulsar 6 has equi-interval teeth along an outer circumference. A crank angle sensor 7 faces the pulsar 6 and detects rotation of the teeth of the pulsar 6 and outputs a signal as the crankshaft 5 and the pulsar 6 rotate.

An engine ECU 8 includes a microcomputer 9, and estimates an operation state of the engine 1 based on an output signal of the crank angle sensor 7, an output signal of the in-cylinder pressure sensor 3, and output signals of various other sensors while executing a control program memorized in a ROM 11 of the microcomputer 9. Further, based on the estimated operation state of the engine 1, the ECU 8 performs a fuel supply control and a fuel injection control by calculating a fuel injection start timing, a duration of fuel injection, and the like.

The details of the engine ECU 8 are described next. The engine ECU 8 includes (i) a crank angle input circuit 12 and a wave pattern correction circuit 13 to process an output signal of the crank angle sensor 7 which are input thereto, and (ii) a low pass filter 14, a buffer circuit 15 and a signal process circuit 17 having an amplification circuit 16 to process an output signal of the in-cylinder pressure sensor 3 which are input thereto. Further, the engine ECU 8 includes, for the correcting of an error that is added to the output signal of the in-cylinder pressure sensor 3 while it is processed by the amplification circuit 16, a first voltage generation circuit 18, a second voltage generation circuit 19, and a switch 20 that switches a signal that is input to a signal process circuit 17. By switching the switch 20, an input signal that is input to the signal process circuit 17 is changed either to (i) an output signal of the in-cylinder pressure sensor 3 or to (ii) an output signal of one of the first voltage generation circuit 18 and the second voltage generation circuit 19.

First, a circuit for processing an output signal of the crank angle sensor 7 is described. The signal that is input to the engine ECU 8 from the crank angle sensor 7 is, after the removal of unnecessary frequency components such as noise and the like by the crank angle input circuit 12, rectified by the wave pattern correction circuit 13, and then is input to the microcomputer 9. An example of implementation of the crank angle input circuit 12 may be shown as a circuit in FIG. 1, which is a combination of a constant voltage power source 12a, resistors 12b, 12c and a capacitor 12d. An example of implementation of the wave pattern correction circuit 13 may be shown as a circuit in FIG. 1, which is a combination of a constant voltage power source 13a, resistors 13b, 13c and a comparator 13d.

Next, a circuit for processing an output signal of the in-cylinder pressure sensor 3 is described. While passing the low pass filter 14, which includes a resistor and a capacitor, unnecessary frequency components such as noise and the like are removed from an output signal of the in-cylinder pressure sensor 3. The output signal of the in-cylinder pressure sensor 3 is input to the engine ECU 8 and then input to the buffer circuit 15. The buffer circuit 15 may be, for example, implemented as an op-amp that is formed as a voltage-follower. The output signal of the in-cylinder pressure sensor 3 which has passed the buffer circuit 15 is then input to the switch 20 through the signal process circuit 17.

The output signal of the in-cylinder pressure sensor 3 that is input to the signal process circuit 17 via the buffer circuit 15 is then divided into two signals. One of the two signals is input to a first channel of a multiplexer 21 in the microcomputer 9, which is further described below, as an output of the signal process circuit 17. The other signal is input to a second channel of the multiplexer 21 that constitutes the microcomputer 9 as an output signal of the signal process circuit 17 via the amplification circuit 16. In the following, a signal that is input to the first channel is designated as Sin and a voltage of such signal is designated as Vin, and a signal that is input to the second channel is designated as Sout and a voltage of such signal is designated as Vout.

An example implementation of the amplification circuit 16 may be a circuit that amplifies an input signal of the amplification circuit 16 as a positive phase input of a differential amplification circuit and that outputs an amplified signal as an output signal of the amplification circuit 16. As a reverse phase input of the differential amplification circuit, a signal that is generated by a reference voltage generation circuit is input. The differential amplification circuit is formed by an op-amp 22a and resistors 22b, 22c, 22d, 22e. The reference voltage generation circuit includes an op-amp 23a that is formed as a voltage-follower, a constant voltage power source 23b and resistors 23c, 23d.

The microcomputer 9 includes, as its components, the multiplexer 21, an A/D converter 24, a RAM 10, a ROM 11, a CPU 25 and the like. The multiplexer 21 receives Sin as an input of the first channel, and receives Sout as an input of the first channel. The multiplexer 21 inputs one of the signals that are input to those channels to the A/D converter 24. The A/D converter 24 A/D-converts the input signal and an A/D conversion value is memorized in the RAM 10. The A/D converter 24 has a specific inputtable range that is defined according to a specification. In the present embodiment, such a range is defined as a range between two (i.e., upper/lower) limits, which are equal to or greater than 0V and equal to or less than 5V, for example. The A/D conversion value of a signal that is input to the first channel (i.e., Sin) is a first A/D conversion value, and the A/D conversion value of a signal that is input to the second channel (i.e., Sout) is a second A/D conversion value. Further, an output signal of the crank angle sensor 7 which has passed the wave pattern correction circuit 13 is input to the microcomputer 9.

The microcomputer 9 performs a switching of the switch 20 by sending a switching signal Sc to the switch 20. Further, the microcomputer 9 sends a first voltage instruction S1 and a second voltage instruction S2 respectively to the first voltage generation circuit 18 and to the second voltage generation circuit 19, and the first voltage generation circuit 18 and the second voltage generation circuit 19 respectively change their output voltages according to such instructions.

Figure 5:
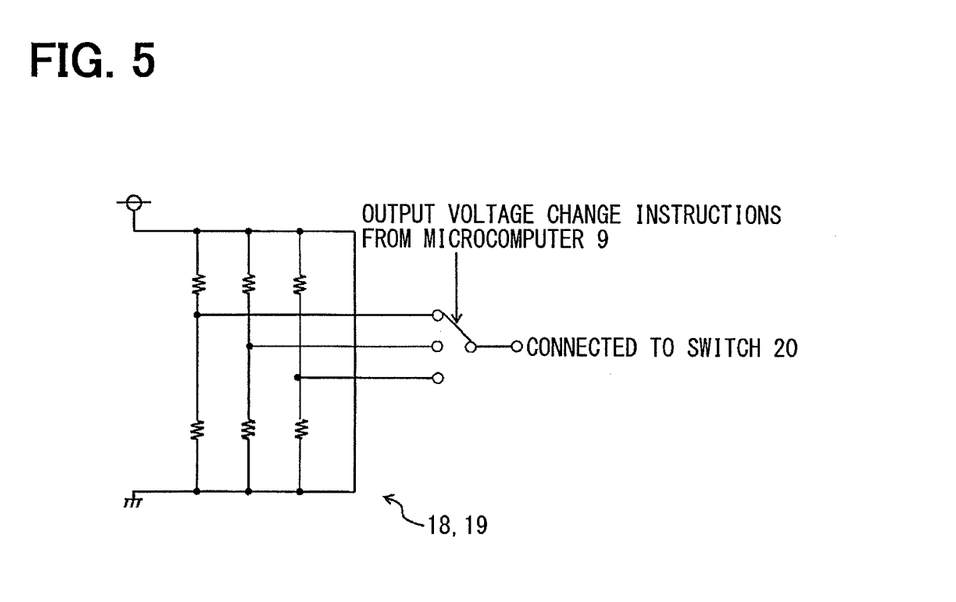
FIG. 5 is a schematic diagram of a first and second voltage generation circuits.

The first voltage generation circuit 18 and the second voltage generation circuit 19 respectively output an output signal to the switch 20. Further, the first voltage generation circuit 18 and the second voltage generation circuit 19 respectively change the voltages of respective output signals according to the output voltage change instructions (i.e., S1 and S2) from the microcomputer 9. An example implementation of the first voltage generation circuit 18 and the second voltage generation circuit 19 may be a circuit shown in FIG. 5, which is a combination of a constant voltage power source, resistors, and a switch, and which is capable of switching the output voltage by switching the switch 20 according to the output voltage change instructions from the microcomputer 9.

The operation of the electronic control system in the present embodiment is described in the following. For detecting the in-cylinder pressure, an output signal of the in-cylinder pressure sensor 3 is input to the engine ECU 8 first, and the input signal passes through the low-pass filter 14, the buffer circuit 15, the switch 20, and the signal process circuit 17, to be input to the microcomputer 9 as the signal Sin and the signal Sout. Then, the signal Sin and the signal Sout input to the microcomputer 9 are A/D-converted by the A/D converter 24 via the multiplexer 21, and the A/D conversion value is memorized in the RAM 10. In such manner, the microcomputer 9 detects the in-cylinder pressure.

The A/D conversion value that is used for the in-cylinder pressure detection is either (i) the A/D conversion value of Sin when the output voltage of the in-cylinder pressure sensor 3 is high or (ii) the A/D conversion value of Sout, which is an amplified signal of the signal Sin, when the output voltage of the sensor 3 is low. In this case, when the A/D conversion value of Sout (i.e., signal Sin amplified) is used for the detection of the in-cylinder pressure, it is required to convert the A/D conversion value of the after-amplification signal Sout to the A/D conversion value of the before-amplification signal Sin. Therefore, an equation of the relationship between the input voltage and the output voltage of the amplification circuit 16 is required.

Because the input voltage Vin of the amplification circuit 16 is input to the differential amplification circuit as a positive phase input and the output voltage of the differential amplification circuit is output as an output voltage Vout of the amplification circuit 16, the relationship between the input voltage and the output voltage of the amplification circuit 16 may be expressed as equation 1.

$$Vout = A \times Vin + B \qquad \text{(Equation 1)}$$

In equation 1, A and B are constants. The constants A and B may be calculated from logical resistance values of each of the components in the amplification circuit 16. However, the constants A and B may vary due to a change of a use environment of the amplification circuit 16, such as temperature variations or due to the age of the circuit 16. Therefore, in the present embodiment, the constants A and B are corrected.

Correcting of the constants A and B in equation 1 which is described in the present disclosure is described in the following. First, the first voltage generation circuit 18 is controlled to generate a voltage Vin1. Then, according to an instruction from the microcomputer 9, when the switch 20 is switched for inputting the Vin1 to the signal process circuit 17 instead of inputting the output signal of the in-cylinder pressure sensor 3, the microcomputer 9 receives an input of the voltage Vin1 and the voltage Vout1, that is an after-amplification voltage of the voltage Vin1 amplified by the amplification circuit 16. Then, Vin1 and Vout1 are respectively A/D-converted. The A/D conversion value of Vin1 is memorized in an area RAMa, which is a part of the RAM 10. The A/D conversion value of Vout1 is memorized in an area RAMb, which is also a part the RAM 10.

Then, substantially similar to above, the second voltage generation circuit 19 is controlled to generate a voltage Vin2, and, by switching the switch 20, Vin2 is input to the microcomputer 9 through the signal process circuit 17. The A/D conversion value of Vin2 is memorized in an area RAMc which is a part of the RAM 10. The A/D conversion value of Vout2, which is an after-amplification value of Vin2 by the amplification circuit 16, is memorized in an area RAMd which is a part of the RAM 10.

Equation 2 is calculated by substituting Vin1 and Vout1, which are memorized in the RAM 10, for Vin and Vout in equation 1.

$$Vout1 = A \times Vin1 + B \qquad \text{(Equation 2)}$$

Equation 3 is calculated by substituting Vin2 and Vout2 for Vin and Vout in equation 1.

$$Vout2 = A \times Vin2 + B \qquad \text{(Equation 3)}$$

The constants A and B in an actual amplification circuit are calculated according to equation 4 and equation 5 in the following, based on equations 2 and 3.

$$A = (Vout2 - Vout1)/(Vin2 - Vin1) \qquad \text{(Equation 4)}$$

$$B = Vout1 - Vin1 \times (Vout2 - Vout1)/(Vin2 - Vin1) \qquad \text{(Equation 5)}$$

The constants A and B calculated as equations 4, 5 are corrected constants A and B to be used in the present embodiment.

Figure 3:
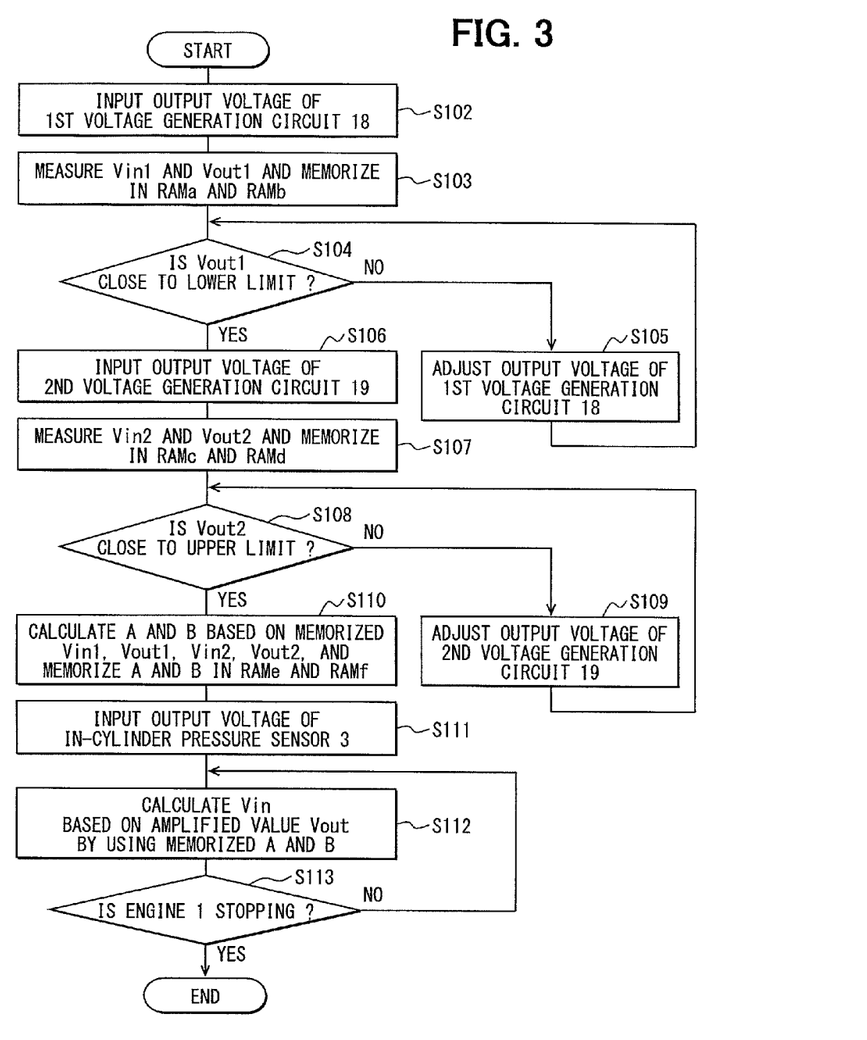
FIG. 3 is a flowchart of an in-cylinder pressure detection process that is performed by a microcomputer in the first embodiment of the present disclosure.

The details of the correcting of the constants A and B of the present embodiment are described in the following. FIG. 3 is a flowchart of the in-cylinder pressure detection process that is performed by the microcomputer 9 in the present embodiment. The flowcharted process of FIG. 3 starts at a time of a turning ON of an ignition switch (i.e., at a time when a switching of the ignition switch from a turn OFF state to a turn ON state is caused). At this step, the microcomputer 9 inputs the output voltage Vin1 of the first voltage generation circuit 18 to the signal process circuit 17 by switching the switch 20 (step S102).

The microcomputer 9 then performs a subroutine (step S103 to S109). In this subroutine, the microcomputer 9 firstly measures Vin1 and Vout1 that are input from the signal process circuit 17, and memorizes them respectively in the RAMa and the RAMb (step S103). Then, it is determined whether the memorized Vout1 in the RAMb is close to a lower limit of the inputtable voltage of the A/D converter, which may be, for example, (i) equal to or greater than a lower limit 0V and (ii) equal to or less than 0.25V (step S104). If it is determined that Vout1 is not close to the lower limit, the microcomputer 9 sends the first voltage instruction S1 to the first voltage generation circuit 18, and adjusts the output voltage until the output voltage comes close to the lower limit (step S105).

If the output voltage comes close to the lower limit, the microcomputer 9 then switches the switch 20 and inputs the output voltage Vin2 of the second voltage generation circuit 19 to the signal process circuit 17 (step S106). The microcomputer 9 measures Vin2 and Vout2 that are input from the signal process circuit 17, and memorizes them respectively in the RAMc and the RAMd (step S107). Then, it is determined whether the memorized Vout2 in the RAMd is close to an upper limit of the inputtable voltage of the A/D converter 24, which may be for example (i) equal to or greater than 4.75V and (ii) equal to or less than an upper limit 5V (step S108), and, if it is determined that Vout2 is not close to the upper limit, the microcomputer 9 sends the second voltage instruction S2 to the second voltage generation circuit 19, and adjusts the output voltage until the output voltage comes close to the upper limit (step S109). When it is determined that Vout2 is close to the upper limit of the inputtable voltage, execution of the subroutine ends.

After the subroutine ends, the microcomputer 9 calculates the constants A and B from equations 4 and 5, based on Vin1, Vout1, Vin2, Vout2 that are respectively memorized in the RAMa, the RAMb, the RAMc, and the RAMd, and memorizes the constants A and B respectively in RAMe and RAMf (step S110). The RAMe and the RAMf are respectively a part of the memory area of the RAM 10. At this point, the corrected constants A and B, which have been corrected based on the measurement of the input voltage and the output voltage of the amplification circuit 16, are obtained. The corrected constants A and B define a characteristic input-output relationship of the amplification circuit 16.

Then, the microcomputer 9 switches the switch 20, inputs an output signal of the in-cylinder pressure sensor 3 to the signal process circuit 17 (step S111), and starts the detection of the in-cylinder pressure (step S112). More practically, the in-cylinder pressure detection may start with an input of Sin and Sout to the A/D converter 24 through the multiplexer 21, for the A/D-conversion of Sin and Sout. Then, based on the A/D conversion value of Sout, it is determined whether Sout is within an inputtable voltage range of the A/D converter 24. If it is determined that Sout is within such voltage range, the voltage Vin of Sin is calculated by substituting the A/D conversion value of Sout and the constants A, B for Vin1 and Vout1 in equation 1. Then, the calculated Vin is used to calculate the in-cylinder pressure. On the other hand, if it is determined that Sout is not within an inputtable voltage range of the A/D converter 24, the A/D conversion value of Sin (i.e., the A/D conversion value of the voltage Vin of Sin) is used to calculate the in-cylinder pressure.

Then, the microcomputer 9 determines whether the engine 1 is stopping (step S113), and either finishes the flow if it is determined that the engine 1 is stopping, or detects the in-cylinder pressure again (step S112) if it is determined that the engine is not stopping.

The effects of the present embodiment are described in the following. In the present embodiment, from among two signals that are input for the correction of the constants A and B, an after-amplification voltage of one signal amplified by the amplification circuit 16 is adjusted to be close to an upper limit of the inputtable voltage range of the A/D converter 24, and an after-amplification voltage of the other signal amplified by the amplification circuit 16 is adjusted to be close to a lower limit of the inputtable voltage range of the same. Therefore, the two signals that are input for the correction of the constants A and B are adjusted to have a greater voltage difference, in consideration of the inputtable voltage range of the A/D converter 24, thereby leading to a highly accurate identification of the constants A and B, which characterize an equation of a relationship between the input voltage and the output voltage of the amplification circuit 16. Thus, the errors that are added to the signal from the in-cylinder pressure sensor 3 in the course of signal amplification by the amplification circuit 16 are corrected, thereby, improving the accuracy of in-cylinder pressure detection.

Second Embodiment

In the present embodiment, a difference from the first embodiment is described. The system configurations of the first and second embodiments are substantially same, with a difference of the process that is performed by the microcomputer 9. While correction of the constants A and B in the first embodiment is performed only once, correction of the constants A and B in the present embodiment is performed for every combustion cycle of the engine 1. More practically, during a "no in-cylinder pressure-required" period in every combustion cycle during which the in-cylinder pressure is not required for engine control, an output signal of the first voltage generation circuit 18 and an output signal of the second voltage generation circuit 19 are input to the signal process circuit 17, in place of the output signal of the in-cylinder pressure sensor 3, for the correction of the constants A and B in every combustion cycle of the engine 1. In the present embodiment, such a period (i.e., the "no in-cylinder pressure-required" period) may be defined between a crank angle of 115 degrees (° CA) and a crank angle of −115 degrees (° CA), where 0 (° CA) is top dead center.

Figure 4:
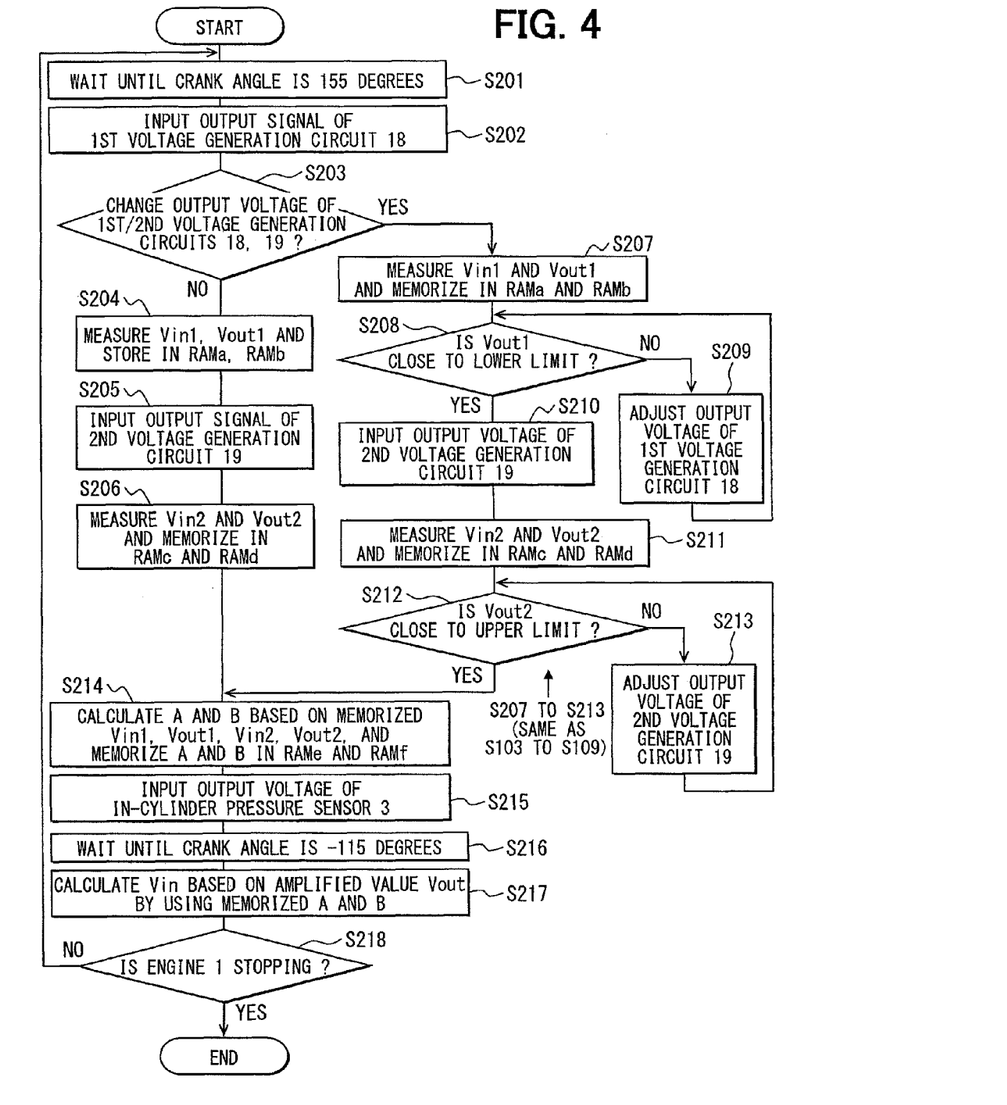
FIG. 4 is a flowchart of the in-cylinder pressure detection process that is performed by the microcomputer in a second embodiment of the present disclosure.

The flowchart of a process in the microcomputer 9 for the present embodiment is illustrated in FIG. 4. The flowcharted process of FIG. 4 starts at a time of turning ON of an ignition switch (i.e., at a time of a switching of the ignition switch from a turn OFF state to a turn ON state). First, the microcomputer 9 waits for a start time of a period during which the in-cylinder pressure is not required for an engine control, that is, waits until a crank angle becomes 155° CA (step S201). Then, by switching the switch 20, the output signal of the first voltage generation circuit 18 is input to the signal process circuit 17 (step S202).

Then, it is determined whether an output voltage of the first voltage generation circuit 18 and an output voltage of the second voltage generation circuit 19 should be substituted with the corrected constants A and B (step S203). In such a determination, it is determined whether a substitution of the electric voltage of the output signals of the first voltage generation circuit 18 and the second voltage generation circuit 19 is currently required due to a change of a use environment of the engine ECU 8 after a previous adjustment of the voltage of the output signals from those circuits 18 and 19. For example, the output signal will be adjusted if determined that a specific amount of time has passed/lapsed that is sufficient for a change in the ambient temperature of the engine ECU 8 (i.e., if it is determined that a lapse time is long enough for such a change to occur). If a specific amount of time sufficient for a change of ambient temperature of the engine ECU 8 has not passed/lapsed (i.e.; if it is determined that the lapse time is not long enough for such a change to occur), the output signal will not be adjusted.

If it is determined not to adjust the output voltage of the first voltage generation circuit 18 and the output voltage of the second voltage generation circuit 19, the microcomputer 9 measures Vin1 and Vout1 that are input from the signal process circuit 17, and memorizes them respectively in the RAMa and the RAMb (step S204). Then, the microcomputer 9 switches the switch 20 and inputs the output signal of the second voltage generation circuit 19 to the signal process circuit 17 (step S205), and measures Vin1 and Vout2 that are input from the signal process circuit 17, and memorizes them respectively in the RAMc and the RAMd (step S206). The process then proceeds to step S214, which is further described below.

On the other hand, if it is determined that the output voltage of the first voltage generation circuit 18 and the output voltage of the second voltage generation circuit 19 should be adjusted, steps S207 to S213 in FIG. 4 will be performed. Steps S207 to S213 are identical to steps S103 to S109 in the first embodiment. Then, if Vout2 is determined to be close to the upper limit of the inputtable voltage range of the A/D converter 24 in step S212, the process proceeds to step S214, which is further described below.

In step S214, the microcomputer 9 calculates the constants A and B by substituting Vin1, Vout1, Vin2, Vout2, that are respectively memorized in the RAMa, the RAMb, the RAMc, and the RAMd, for variables in equations 4 and 5, and memorizes the constants A and B in the RAMe and the RAMf. Then, the microcomputer 9 switches the switch 20, and inputs an output signal of the in-cylinder pressure sensor 3 to the signal process circuit 17 (step S215), and waits for a start time of a period in which the in-cylinder pressure is required for an engine control, that is, waits for a timing when a crank angle becomes −115° CA in the present embodiment (step S216). When a crank angle reaches −115° CA, the detection of the in-cylinder pressure is started (step S217). A process for detecting the in-cylinder pressure is similar to the first embodiment. Then, the process determines whether the engine 1 is stopping (step S218). The process ends if determined that the engine 1 is stopping, or returns to step S201 if determined that the engine 1 is not stopping.

The corrected constants A and B in the present embodiment are corrected for every combustion cycle. Therefore, the corrected constants A and B in the present embodiment are closer to the constants A and B of the actual amplification circuit 16 than the constants A and B in the first embodiment, which have only been corrected once at a time of turning ON of the ignition switch. Therefore, by using the corrected constants A and B, the accuracy of the detected in-cylinder pressure is improved in the present embodiment.

Further, in the present embodiment, it is determined in every combustion cycle whether the voltage of the output signal of the first voltage generation circuit 18 and the voltage of the output signal of the second voltage generation circuit 19, which are two input signals to be input for correction, should be adjusted (i.e., substituted or corrected). The voltage of the output signals are adjusted if determined that adjustment is necessary. In such adjustments of those voltages, the voltages (i.e., the voltage of the output signal of the first voltage generation circuit 18 and the voltage of the output signal of the second voltage generation circuit 19) are respectively adjusted to have a greater voltage difference between each other, in consideration of the inputtable voltage range of the A/D converter 24. Thus, with an adjustment of the constants A and B having a voltage difference between the two signals that is as wide as possible within the inputtable voltage range of the A/D converter 24, the correction of the constants A and B is accurately performed, thereby improving the accuracy of the detected in-cylinder pressure.

Although the present disclosure has been fully described in connection with the above embodiment thereof with reference to the accompanying drawings, it is to be noted that various changes and modifications will become apparent to those skilled in the art, and such changes and modifications are to be understood as being within the scope of the present disclosure as defined by the appended claims.

What is claimed is:

1. An in-vehicle electronic control unit (ECU) comprising:
   a signal process circuit that receives and processes a sensor output signal from a sensor;
   a multi-channel A/D converter that performs an A/D conversion of the sensor output signal that has been processed by the signal process circuit;
   a microcomputer that processes an A/D conversion value that is derived from the A/D conversion of the sensor output signal by the multi-channel A/D converter;
   a first voltage generator and a second voltage generator that switch an output voltage according to an instruction from the microcomputer; and
   an input signal switcher that switches the sensor output signal for input into the signal process circuit according to an instruction from the microcomputer, the sensor output signal for input is either (i) the sensor output signal from the sensor or (ii) a first output signal generated by the first voltage generator or a second output signal generated by the second voltage generator, wherein
   (A) the signal process circuit divides the sensor output signal that is input to the ECU into a first signal and a second signal, the first signal is input into a first input terminal of the multi-channel A/D converter and the second signal is input into a second input terminal of the multi-channel A/D converter after an amplification of the signal by an amplification circuit,
   (B) the microcomputer has a first voltage controller, a second voltage controller, and an identification unit, wherein
   the first voltage controller adjusts an output voltage of the first voltage generator until the second signal input into the second input terminal of the multi-channel A/D converter 1) reaches a voltage value that is within an inputtable voltage range of the second input terminal and 2) is close to a lower limit of the inputtable voltage range when the first output signal generated by the first voltage generator is input to the signal process circuit,
   the second voltage controller adjusts an output voltage of the second voltage generator until the second signal input to the second input terminal of the multi-channel A/D converter 1) reaches a voltage value that is within an inputtable voltage range of the second input terminal and 2) is close to an upper limit of the inputtable voltage range when the second output signal generated by the second voltage generator is input to the signal process circuit, and
   the identification unit models a linear function that linearly associates an input voltage of the amplification circuit with an output voltage of the amplification circuit and identifies the linear function of the input voltage of the amplification circuit based on (i) a first A/D conversion value and a second A/D conversion value at a time when the first output signal generated by the first voltage generator is input to the signal process circuit and (ii) a first A/D conversion value and a second A/D conversion value at a time when the second output signal generated by the second voltage generator is input to the signal process circuit.

2. The in-vehicle electronic control unit of claim 1, wherein
   the sensor is an in-cylinder pressure sensor.

3. The in-vehicle electronic control unit of claim 1, wherein
   the microcomputer receives an output signal of a crank angle sensor, and the microcomputer sends an instruction to the input signal switcher according to the output signal of the crank angle sensor.

4. The in-vehicle electronic control unit of claim 1, wherein
   the first voltage controller adjusting the output voltage of the first voltage generator includes continuously adjusting the output voltage of the first voltage generator until the second signal input into the second input terminal of the multi-channel A/D converter 1) reaches the voltage value that is within the inputtable voltage range of the second input terminal and 2) is close to the lower limit of the inputtable voltage range when the first output signal generated by the first voltage generator is input to the signal process circuit, and
   the second voltage controller adjusting the output voltage of the second voltage generator includes continuously adjusting the output voltage of the second voltage generator until the second signal input into the second input terminal of the multi-channel A/D converter 1) reaches the voltage value that is within the inputtable voltage range of the second input terminal and 2) is close to the upper limit of the inputtable voltage range when the second output signal generated by the second voltage generator is input to the signal process circuit.

5. The in-vehicle electronic control unit of claim 1, wherein
   the first voltage controller adjusting the output voltage of the first voltage generator includes repeatedly adjusting the output voltage of the first voltage generator until the second signal input into the second input terminal of the multi-channel A/D converter 1) reaches the voltage value that is within the inputtable voltage range of the second input terminal and 2) is close to the lower limit of the inputtable voltage range when the first output signal generated by the first voltage generator is input to the signal process circuit, and
   the second voltage controller adjusting the output voltage of the second voltage generator includes repeatedly adjusting the output voltage of the second voltage generator until the second signal input into the second input terminal of the multi-channel A/D converter 1) reaches the voltage value that is within the inputtable voltage range of the second input terminal and 2) is close to the upper limit of the inputtable voltage range when the second output signal generated by the second voltage generator is input to the signal process circuit.

6. The in-vehicle electronic control unit of claim 1, wherein
   the first voltage controller adjusting the output voltage of the first voltage generator includes adjusting the output voltage of the first generator until an amplified output voltage of the first voltage generator input into the second input terminal of the multi-channel A/D converter 1) reaches the voltage value that is within the inputtable voltage range of the second input terminal and 2) is close to the lower limit of the inputtable voltage range when the first output signal generated by the first voltage generator is input to the signal process circuit, and
   the second controller adjusting the output voltage of the second voltage generator includes adjusting the output voltage of the second generator until an amplified output voltage of the first voltage generator input into the second input terminal of the multi-channel A/D converter 1) reaches the voltage value that is within the inputtable voltage range of the second input terminal and 2) is close to the upper limit of the inputtable voltage range when the second output signal generated by the second voltage generator is input to the signal process circuit.

* * * * *